United States Patent [19]
Occhialini et al.

[11] 3,774,313
[45] Nov. 27, 1973

[54] APPARATUS FOR CHECKING GEAR TEETH AND THEIR ANOMALIES

[75] Inventors: Carlo Occhialini; Claudio Tattini, both of Bologna, Italy

[73] Assignee: Samputensill S.p.A., Bologna, Italy

[22] Filed: July 1, 1971

[21] Appl. No.: 158,954

[30] Foreign Application Priority Data
July 2, 1970   Italy .................................. 3476 A/70

[52] U.S. Cl. .............................. 33/179.5 B, 73/162
[51] Int. Cl. ......................................... G01m 13/02
[58] Field of Search .................. 73/162; 33/179.5 B, 33/179.5 C, 179.5 E, 179.5 R

[56] References Cited
UNITED STATES PATENTS
2,815,581   12/1957   Strelow .......................... 33/179.5 B FOREIGN PATENTS OR APPLICATIONS
527,384   5/1955   Italy ................................ 33/179.5 B

*Primary Examiner*—Richard C. Queisser
*Assistant Examiner*—Denis E. Corr
*Attorney*—Ernest G. Montague

[57] ABSTRACT

Apparatus for checking gear teeth and their anomalies, which comprises a specimen gear including at least three toothed wheels. A gear which is to be checked and in mesh with the wheels. The wheels are placed one on top of the other, and are free to rotate together or individually, in order to check anomalies present in the gear to be checked.

6 Claims, 3 Drawing Figures

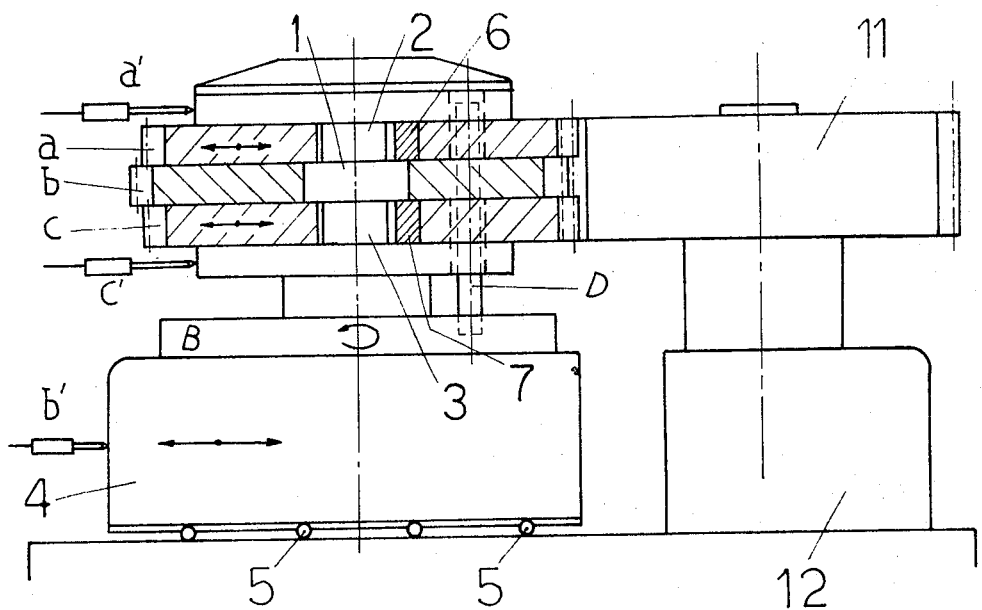
FIG. 1
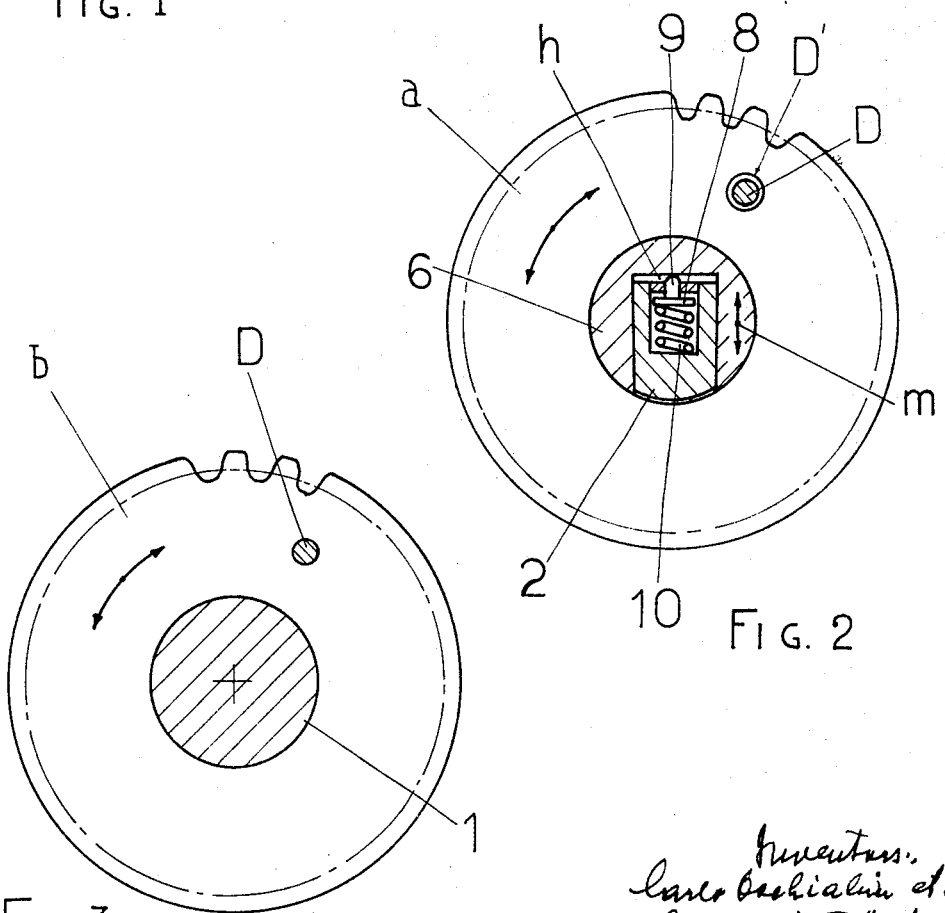
FIG. 2
FIG. 3

APPARATUS FOR CHECKING GEAR TEETH AND THEIR ANOMALIES

The present invention relates to an apparatus for checking the teeth or gears and their ability to roll and to center. Apparatus of this type, offering a direct check and a direct reading of gear anomalies, does not appear either to be in use or to be known at the present time.

It is one object of the present invention, to provide an apparatus for checking the rolling of straight toothed, helical, conical and worm gears of both external teeth and internal teeth and for supply information and to immediately detect any error in eccentricity or in the distance between one center and another. Furthermore, the apparatus which is fitted with a plurality of toothed wheels, placed one on top of the other and free to complete small axial movements, forms a specimen gear for analyzing other gears.

It is another object of the present invention to provide an apparatus which is able to detect any anomaly which may exist in a given area of the profile of each tooth of the gear being inspected, such as, for example, dents which are an important and frequent cause of noise in gear transmission systems.

Another purpose is for the specimen gear to mate perfectly with the gear being inspected, even when the teeth of the latter have a convex contour.

With these and other objects in view which will become apparent in the following detailed description, the present invention will be clearly understood in connection with the accompanying drawings, in which:

FIG. 1 is an elevation partly in section, of the apparatus designed in accordance with the present invention.

FIG. 2 is a top plan view of the wheels; and

FIG. 3 is a plan view of the center wheel, the specimen gear consisting of three wheels.

Referring now to the drawings and in particular to FIG. 1, a specimen gear is provided which engages a gear 11 for checking purposes. The specimen gear has three toothed wheels $a$, $b$, and $c$. They are mounted one on top of the other in a special support, which is divided into parts 1, 2 and 3, corresponding to the actual wheels $a$, $b$ and $c$ themselves.

The toothed wheel $b$ in the center is placed directly on a circular housing 1 with the necessary precision, to be able to rotate without there being any appreciable radial play. Through the support, it becomes integral with a moving carriage 4, which slides on rails and rollers or on high precision ball bearings 5.

The two toothed wheels $a$ and $c$, at the top and bottom, are mounted on centering bushes 6 and 7 and rotate without there being any appreciable radial play. The seats of the bushes 6 and 7 on the supports 2 and 3 are rectangular and thus instead of being able to rotate, they can only effect small radial movements $m$ (FIG. 2), as they are provided with an indentation $h$ at the front, compared with the location of their seats on the support, while over the lateral surfaces they can slide and effect high precision mating. In consequence of this, compared with the support, the top and bottom wheels $a$ and $c$, undergo a rotating movement which can also be combined with small translations $m$ perpendicularly to the axis (FIG. 2).

On each rectangular seat of the support there is a cylindrical housing 8 in which a plunger 9 is located together with a cap and a compression spring 10 (FIG. 2), which serves to keep the wheels $a$ and $c$ loaded at the right pressure on the gear 11 being inspected. The specimen gear $a$, $b$ and $c$ takes its rotating motion from an electric motor placed below it, through a wheel B and a pin D, which fits tight into a hole in a center wheel, without there being any play, while with the holes D' in the top and bottom wheels $a$ and $c$, there is sufficient play in the mating to allow the wheels to perform small radial movements. While the check is proceeding, the specimen gears $a$, $b$, $c$ mesh with the gear 11 being inspected, which is loosely mounted on a fixed carriage 12 and after the latter has completed one revolution, a detector $b'$ with which the moving carriage 4 is provided, will have caused any eventual error in eccentricity or in the center to center distances to be noted. The detectors $a'$ and $c'$ fitted to the collars of the two toothed wheels $a$ and $c$ will check, through small radial movements of the two wheels in question, whether there are any anomalies, such as the profile of one or more teeth in the gear 11 under inspection being dented. In particular, should there be any dents or irregularity in the profile of a tooth in the upper part of the gear 11, the toothed wheel will effect a radial movement in one direction and the detector $a'$ will supply the relevant value with a plus sign. Likewise, in the event of there being any irregularity in the profile of a tooth in the lower part of the gear 11, the detector $c'$ will supply the relevant value with a plus sign.

If, instead, the irregularity were to be in the central part of the gear 11 under inspection, the two wheels $a$ and $c$ will move forward, i.e., towards the right and both the detectors $a'$ and $c'$ will supply the relevant value with a plus sign.

Obviously the envisaged detectors mounted on the apparatus have to be of a known electronic or mechanical type and be suitable for the purpose for which they are being used.

While a suggested embodiment of the present invention has been herein illustrated and described, it will be understood that the present invention may be embodied in other forms within the scope of the following claims.

While we have disclosed several embodiments of the present invention it is to be understood that these embodiments are given by example only and not in a limiting sense.

We claim:

1. An apparatus for checking gear teeth and their anomalies, comprising
   a specimen gear including at least three toothed wheels,
   a gear to be checked in mesh with said wheels,
   said wheels being placed one on top of the other, and free to rotate,
   means mounting each of said toothed wheels permitting each of said toothed wheels to undergo radial displacement relative to the other of said toothed wheels along an imaginary line between the centers of said each of said toothed wheels and said gear to be tested, and
   separate detector means for each of said toothed wheels for detecting said radial displacement thereof.

2. The apparatus, as set forth in claim 1, wherein a central wheel of said toothed wheels includes a central mounting means for radial movements thereof, a support carriage integral with said central mounting means and including a detector instrument mounted thereon, so that said support carriage transfers said radial movements of said central mounting means to said detector instrument.

3. The apparatus, as set forth in claim 1, wherein a top and bottom of said toothed wheels include top and bottom mounting means for an independent radial movement, and said top and bottom mounting means each include a rectangular part in each of said wheels, and a centering bushing on which a corresponding of said toothed wheel is mounted without radial play, said rectangular part is complementarily disposed slidably in said centering bushing relative thereto, a plunger means and a compression spring cooperating together and with said centering bushing and said rectangular part biasing said corresponding toothed wheel against said gear to be tested.

4. The apparatus as set forth in claim 2, wherein said top and bottom wheels have a collar each, and said detector instruments are fitted to each of said collars of said top and bottom wheels.

5. An apparatus for checking gear teeth and their anomalies comprises a specimen gear including at least three toothed wheels, a gear to be checked in mesh with said wheels, said wheels being placed one on top of the other, and free to rotate together or individually, in order to check anomalies present in the gear to be checked, a central wheel of said toothed wheels defines a hole, bottom and top wheels of said toothed wheels define holes therein, and a pin passes fittingly without play through said hole of said central toothed wheel, and with play through said holes of said top and bottom toothed wheels.

6. The apparatus, as set forth in claim 5, further comprising motor means connected to said pin for orbiting said pin.

* * * * *

UNITED STATES PATENT OFFICE
CERTIFICATE OF CORRECTION

Patent No. 3,774,313      Dated November 27, 1973

Inventor(s) Carlo Occhialini, et al.

It is certified that error appears in the above-identified patent and that said Letters Patent are hereby corrected as shown below:

On the cover sheet item [73] "Samputensill S.p.A."

should read -- Samputensili S.p.A. --

Signed and sealed this 7th day of May 1974.

(SEAL)
Attest:

EDWARD M. FLETCHER, JR.　　　　　　C. MARSHALL DANN
Attesting Officer　　　　　　　　　　Commissioner of Patents